(12) United States Patent
Orchard

(10) Patent No.: US 7,424,506 B2
(45) Date of Patent: Sep. 9, 2008

(54) ARCHITECTURE AND RELATED METHODS FOR EFFICIENTLY PERFORMING COMPLEX ARITHMETIC

(75) Inventor: John T. Orchard, Menlo Park, CA (US)

(73) Assignee: Durham Logistics LLC, Las Vegas, NV (US)

(*) Notice: Subject to any disclaimer, the term of this patent is extended or adjusted under 35 U.S.C. 154(b) by 346 days.

(21) Appl. No.: 09/823,928

(22) Filed: Mar. 31, 2001

(65) Prior Publication Data
US 2002/0169812 A1    Nov. 14, 2002

(51) Int. Cl.
G06F 7/52 (2006.01)
(52) U.S. Cl. .................. 708/629; 708/622
(58) Field of Classification Search ........... 708/230, 708/232, 233, 235, 620, 622, 625–632; 707/625–632
See application file for complete search history.

(56) References Cited

U.S. PATENT DOCUMENTS

| | | | | | |
|---|---|---|---|---|---|
| 4,706,211 | A | * | 11/1987 | Yamazaki et al. | 708/630 |
| 5,724,276 | A | * | 3/1998 | Rose et al. | 708/235 |
| 5,754,459 | A | * | 5/1998 | Telikepalli | 708/627 |
| 5,935,201 | A | * | 8/1999 | Costa et al. | 708/625 |
| 6,427,156 | B1 | * | 7/2002 | Chapman et al. | 708/235 |
| 6,535,901 | B1 | * | 3/2003 | Grisamore | 708/629 |

* cited by examiner

Primary Examiner—Chuong D Ngo
(74) Attorney, Agent, or Firm—Stolowitz Ford Cowger LLP

(57) ABSTRACT

A method is presented comprising analyzing two or more input terms on a per-bit basis within each level of bit-significance. Maximally segmenting each of the levels of bit-significance into one or more one-, two-, and/or three-bit groups, and designing a hyperpipelined hybrid Wallace tree adder utilizing one or more full-adders, half-adders, and associated register based, at least in part, on the maximal segmentation of the input terms.

28 Claims, 5 Drawing Sheets

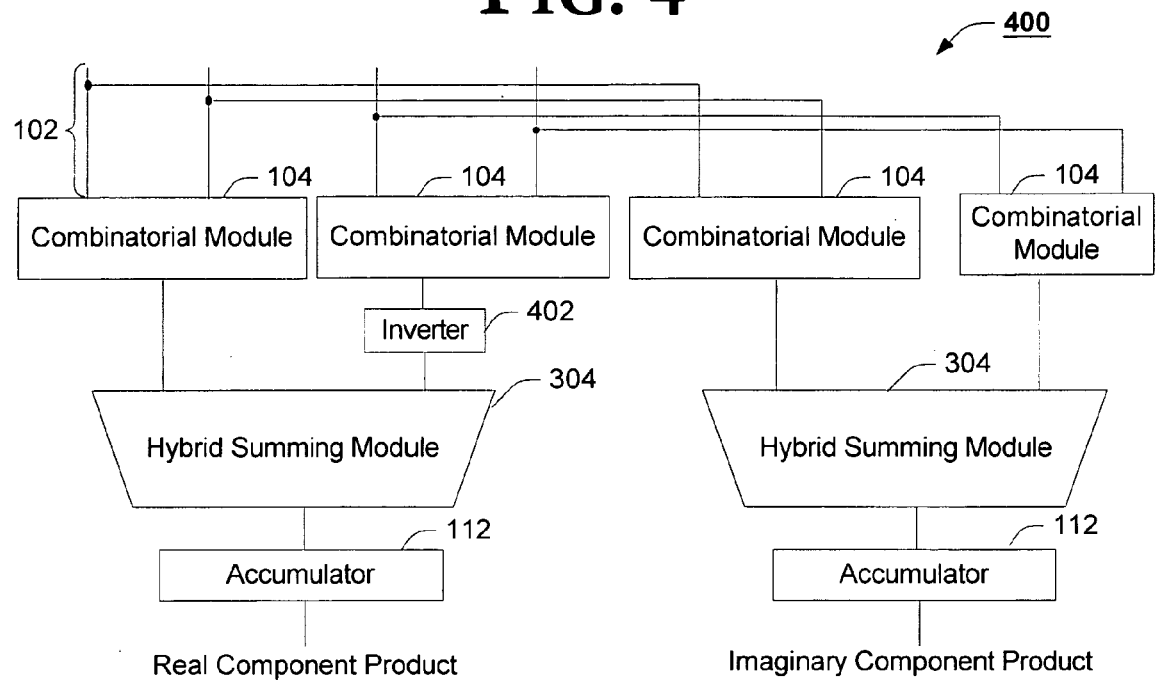
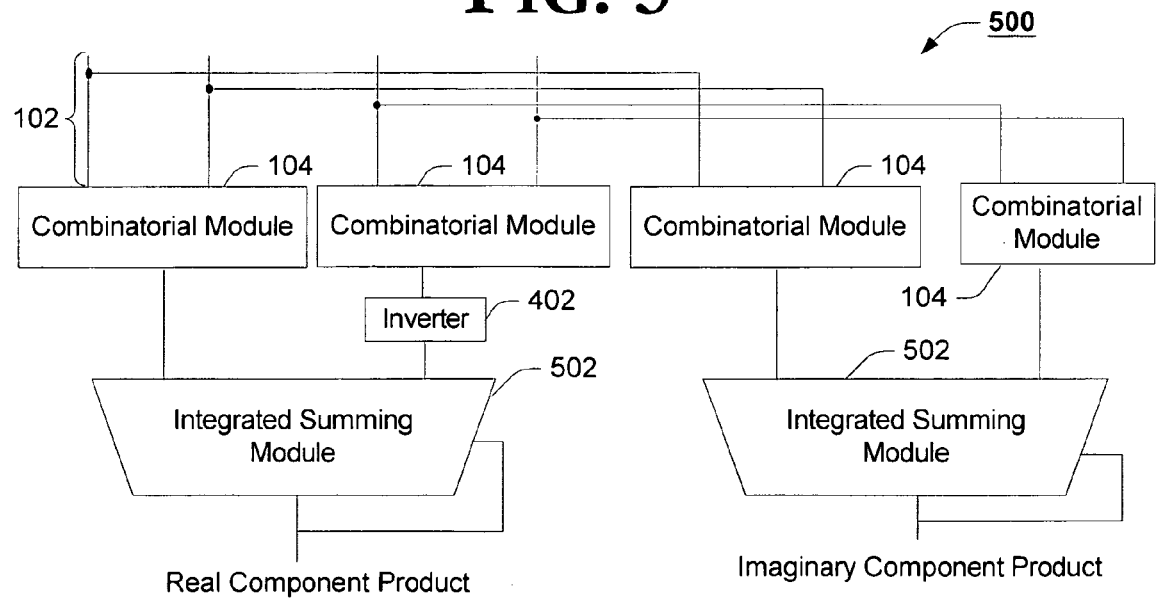

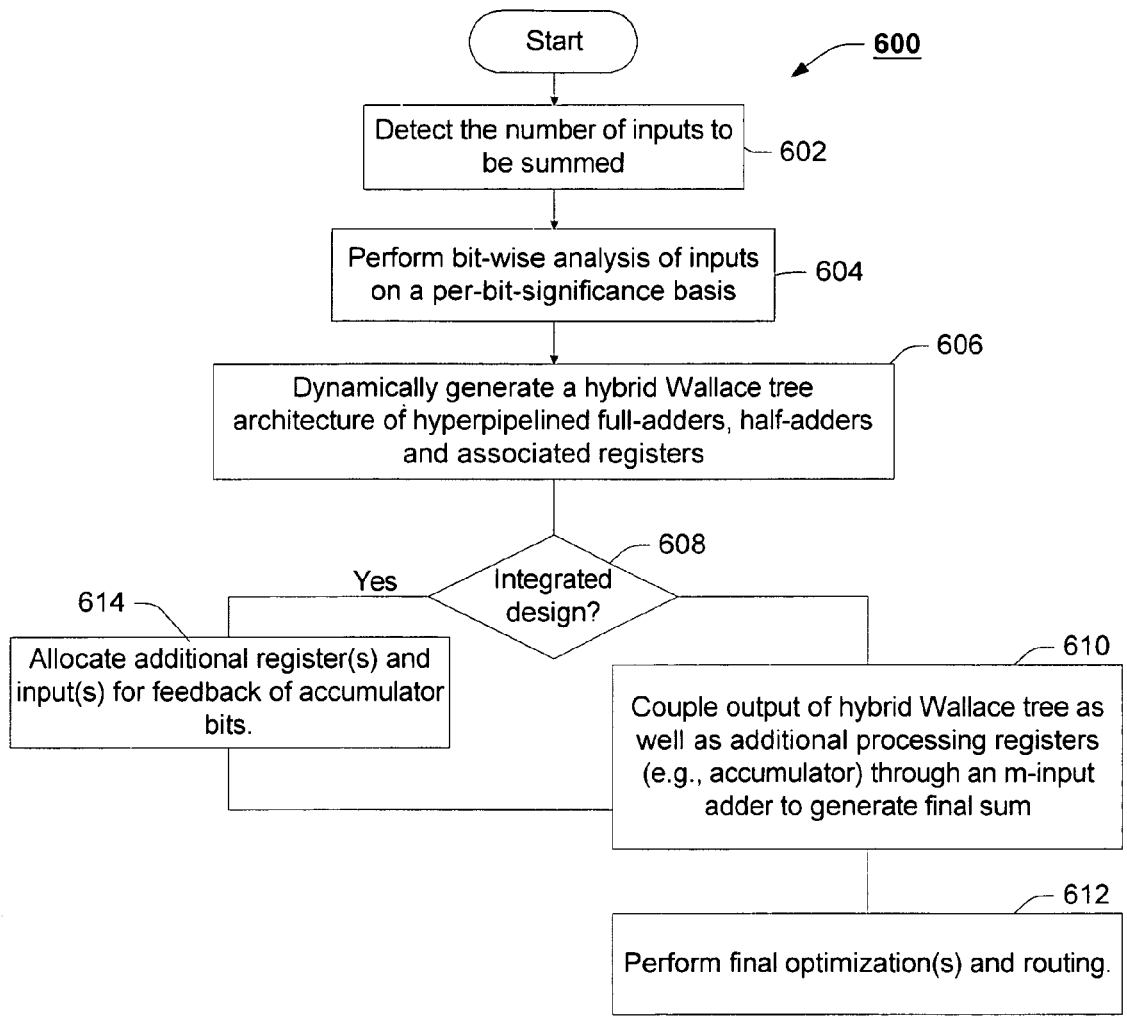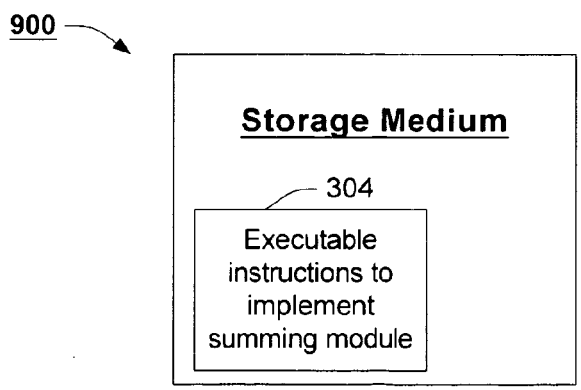

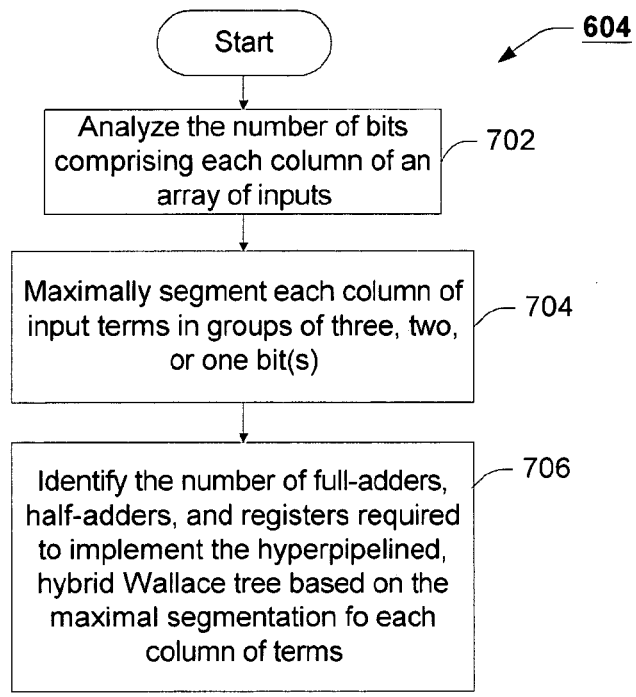
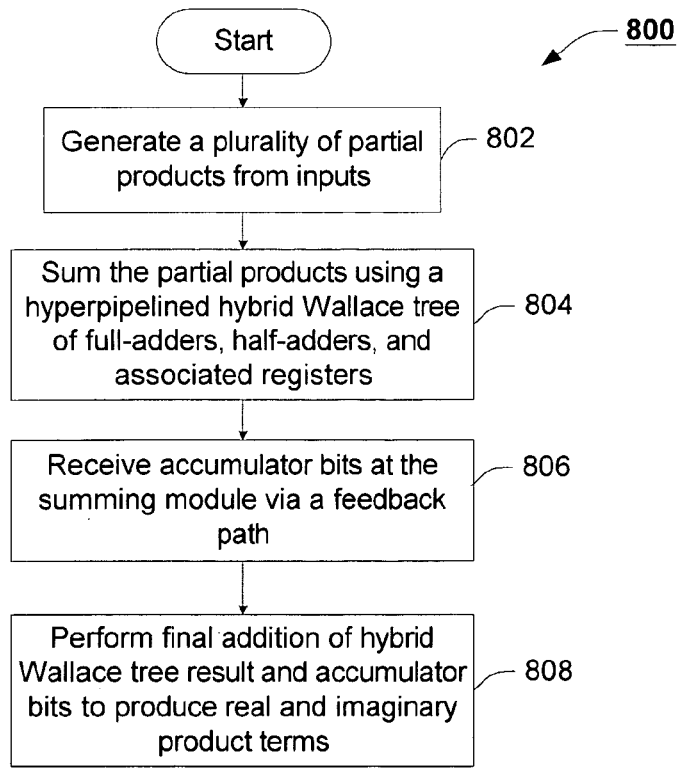

ARCHITECTURE AND RELATED METHODS FOR EFFICIENTLY PERFORMING COMPLEX ARITHMETIC

TECHNICAL FIELD

This invention generally relates to the field of data processing and, more particularly, to a system and method for generating a hyperpipelined hybrid summing module.

BACKGROUND

The use of complex numbers, and the arithmetic associated with such complex numbers affects many of us in our everyday lives. Complex numbers are two-dimensional numbers comprising a real component and an imaginary component, commonly represented mathematically in the form a+bi. Electromagnetic (EM) fields, such as those used in wireless communications (e.g., for our cellular phones, pagers, etc.), represent a prime example of how complex numbers touch our daily lives. An EM field, such as those passed to/from a cell phone in a wireless communication system, are well-suited to representation in complex form as an EM field is comprised of an electrical energy component (e.g., the "real" component of the complex value) and a magnetic energy field component (e.g., the "imaginary" component of the complex value).

The processing of EM fields, for example, relies heavily on the arithmetic of such complex numbers in general, and the multiplication and addition of such numbers in particular. Typically, such signal processing is performed in specially programmed general purpose processors often referred to as a digital signal processor. The advantage of using a DSP to perform the complex arithmetic is that (1) it is relatively easy to program to perform such tasks, and (2) the DSP is used to perform a number of other tasks and, therefore, obviates the need for additional devices. One significant problem with this approach is that the DSP is often burdened with a number of processing tasks and while relatively simple to implement in a DSP, complex arithmetic is very time consuming and represents a large drain on processor resources.

To illustrate the burden of complex arithmetic, equations (1) through (5), below provide a mathematical illustration of a process for multiplying two relative simple matrices.

$$(a1 + b1j, a2 + b2j)\begin{pmatrix} c1 + d1j \\ c2 + d2j \end{pmatrix} \quad (1)$$

$$= (a1 + b1j)(c1 + d1j) + (a2 + b2j)(c2 + d2j) \quad (2)$$

$$= (a1c1 - b1d1) + (a1d1 + b1c1)j + (a2c2 - b2d2) + (a2d2 + b2c2)j \quad (3)$$

$$= (a1c1 - b1d1) + (a2c2 - b2d2) + (a1d1 + b1c1)j + (a2d2 + b2c2)j \quad (4)$$

$$= (a1c1 - b1d1 + a2c2 - b2d2) + (a1d1 + b1c1 + a2c2 + b2c2)j \quad (5)$$

This process can readily be extended to any length of complex vectors, and by extension, any size complex matrices.

At its core, the multiplication of complex numbers (complex multiply accumulate (CMAC)) begins with N×M binary digital multiplication, followed by the summing stages (wherein values are added/subtracted), and includes an additional accumulator stage. The combinatorial stage is often implemented with exclusive OR (XOR) gates that produce either N or M partial product terms (depending on the number of digits in the multiplicands). In the summing stage the partial products are added (e.g., within complex trees of carry-save adders) to produce a first interim product, which is passed to an accumulator. The accumulator adds the first interim product with accumulator bits resulting in the carry-save adders to output the final product. Thus, to perform this relatively simple multiplication at the atomic level of, for example, a digital signal processor (DSP) requires the following steps:

1. a1*c1, store product in accumulator;
2. b1*d1, subtract from accumulator;
3. a2*c2, add to accumulator;
4. b2*d2, subtract from accumulator, store in register as real component;
5. a1*d1, store in accumulator;
6. b1*d1, add to accumulator;
7. a2*d2, add to accumulator;
8. b2*c2, add to accumulator, store in register as imaginary component.

Thus, eight steps are required to complete the CMAC of these 2×2 matrices. Those skilled in the art will appreciate that when larger matrices are involved (e.g., signal processing within a wireless telephony application), the processing associated with the multiplication of complex numbers can quickly overwhelm even the most powerful DSPs.

In an effort to reduce the processing burden on the signal processor in performing complex number arithmetic, such as the multiplication example above, a number of alternate approaches ranging from simplifying the processing task, to offloading the processing of complex numbers to dedicated logic devices (e.g., programmable logic arrays (PLA), field programmable gate arrays (FPGA), and the like).

In this regard, more sophisticated multipliers have been developed that attempt to simplify the processing task associated with complex numbers through integration of a Wallace adder tree, and/or the Dadda bit-wise analysis of input terms. Each of the Wallace adder tree, and/or the Dadda bit-wise analysis technique are useful in simplifying the addition of binary terms which, as illustrated above, is germane to a multiplication process as well. To illustrate a conventional Wallace tree architecture, one branch of a conventional CMAC implementation is depicted in FIG. 1. Turning briefly to FIG. 1, the multiplier (100) receives a number of inputs (102) at the combinatorial stage (104), which generates a plurality of partial products (106A-N). These products are applied to a summing stage (108) incorporating a multi-stage, hierarchical tree of full-adders (110A-N) in accordance with a conventional Wallace tree architecture. The Wallace tree (110A-N) sums the input (e.g., partial product terms) according to bit significance (or magnitude). The Wallace tree output is passed to the accumulator stage (112) to generate the final product. The Dadda analysis may provide further optimization by specific analysis of bit-level operations.

While each of the Wallace and Dadda techniques provide improved performance over more conventional adder circuits, they rely heavily on a large number of full adder stages through which the signals must propagate. As a result, summing module designs (i.e., used as a stand-alone adder or in a multiplication application) employing a conventional Wallace-Dadda tree architecture are not well suited for implementation within, for example, a field programmable gate array (FPGA).

Thus, an architecture and related methods for performing efficient complex multiply-accumulates is presented, unencumbered by the deficiencies and limitations commonly associated with the prior art.

SUMMARY

A method is presented comprising analyzing two or more input terms on a per-bit basis within each level of bit-significance. Maximally segmenting each of the levels of bit-significance into one or more one-, two-, and/or three-bit groups, and designing a hyperpipelined hybrid Wallace tree adder utilizing one or more full-adders, half-adders, and associated register based, at least in part, on the maximal segmentation of the input terms.

BRIEF DESCRIPTION OF THE DRAWINGS

The present invention is illustrated by way of example, and not necessarily by way of limitation in the figures of the accompanying drawings in which like reference numerals refer to similar elements.

FIG. 4 provides a graphical illustration of an example CMAC architecture incorporating the summing module of FIG. 3, in accordance with one example implementation of the present invention;

FIG. 5 provides a graphical illustration of an example CMAC architecture incorporating an alternate embodiment of the summing module, in accordance with another aspect of the invention;

FIG. 6 is flow chart illustrating an example method of generating a hyperpipelined hybrid summing module, in accordance with one aspect of the present invention;

FIG. 7 is a flow chart illustrating an example method of multiplying binary numbers in accordance with an example implementation of the present invention;

FIG. 8 is a flow chart of an example method for performing complex multiply-accumulate on complex numbers in accordance with an example implementation of the present invention; and FIG. 9 is a graphical illustration of an example storage medium including instructions which, when executed, implement the teachings of the present invention.

DETAILED DESCRIPTION

Figure 1:
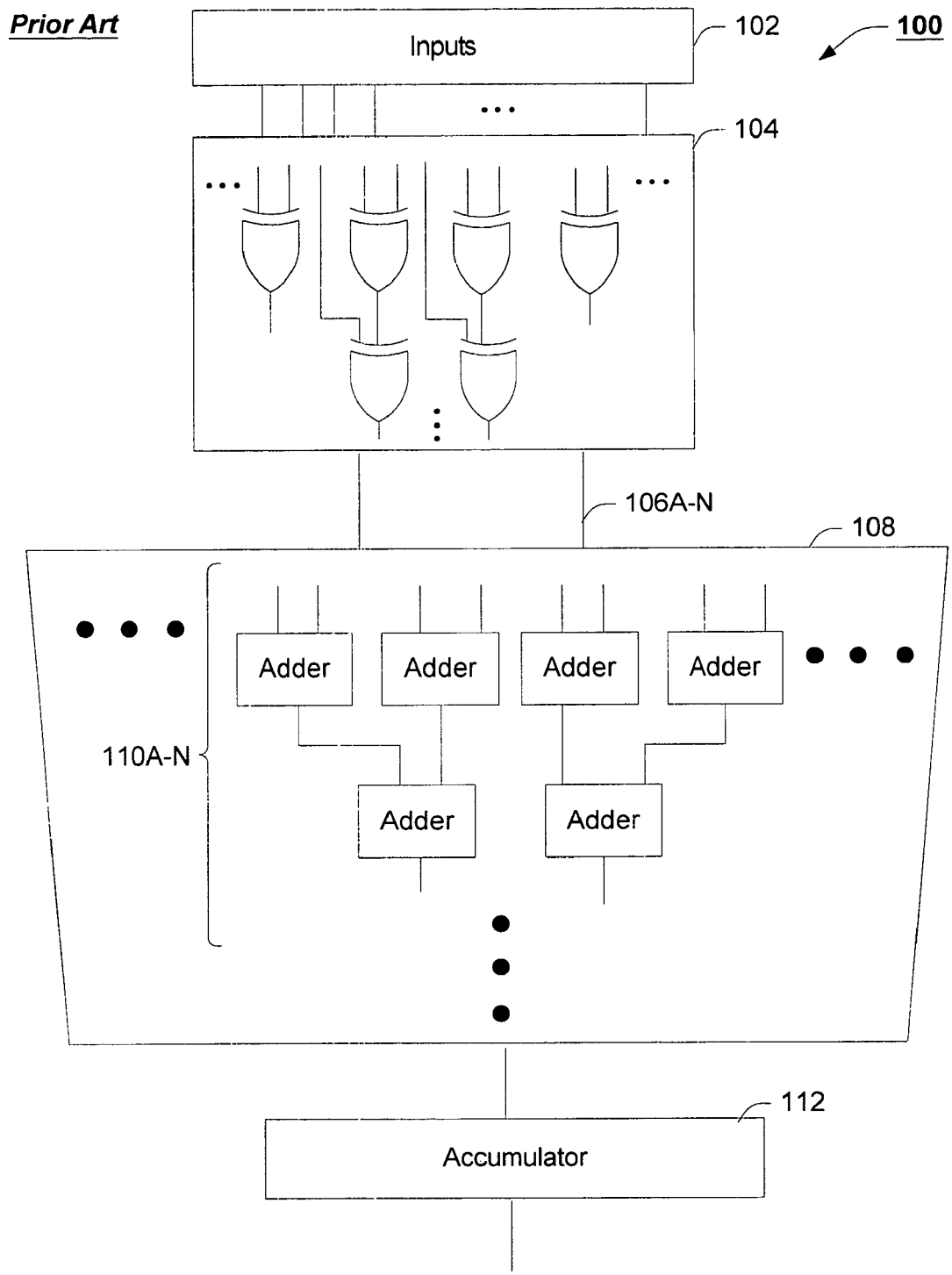
FIG. 1 is a block diagram of a single branch of a complex multiply-accumulator (CMAC) employing a conventional Wallace adder tree architecture.

This invention concerns an architecture and related methods for efficiently performing complex arithmetic. More particularly, an architecture for an extensible, hyperpipelined hybrid summing module is introduced, along with associated methods for its fabrication in a dedicated logic device and its use in performing a myriad of complex arithmetic operations. According to one aspect of the present invention, the extensible, hyperpipelined hybrid summing module selectively utilizes a selectively chosen number of full-adders, half-adders and their associated registers to dynamically generate a hybrid Wallace adder tree based, at least in part, on a Dadda bit-wise analysis of the input to the summing module. As developed more fully below, the bit-wise analysis of the input enables a summing module generator to design and implement a hyperpipelined hybrid summing module in a dedicated logic device at the atomic level of the device, thereby improving performance of the complex mathematical operations by a factor of two (2) or more over conventional implementations.

In accordance with another aspect of the invention, the hyperpipelined summing module architecture is extended to enable the input and processing of accumulator bits. By introducing the accumulator bits into register(s) of the hyperpipelined summing module, the summing module (referred to in this mode as an integrated summing module) is extended to perform the function commonly associated with that of a conventional accumulator, thereby eliminating the need for this additional consumption of resources within the dedicated logic device. In this regard, the innovative summing module architecture introduced herein provides a flexible, extensible solution to improve the performance of associated arithmetic functions in a signal-processing environment.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Example Operational Environment

As introduced above, the extensible, hyperpipelined hybrid summing module is well-suited to implementation within any one or more of a number of dedicated logic devices such as, for example, PLAs, FPGAs, and the like. For purposes of illustration, and not limitation, the discussion to follow will focus primarily on the example implementation within an FPGA. FPGAs are an array of programmable logic cells interconnected by a matrix of wires and programmable switches which are programmed to perform a certain task(s). More particularly, the discussion to follow will illustrate an example method for implementing an innovative hyperpipelined, hybrid summing module architecture utilizing atomic level resources of an FPGA. Those skilled in the art will appreciate, however, that the teachings of the present invention are readily adaptable to other logic devices. Moreover, because of the performance attributes associated with FPGAs, it is becoming increasingly popular to implement DSPs, or more general purpose logic devices, using FPGAs. Thus, to provide a foundation for this discussion, attention is directed to FIG. 2 wherein an example programming environment including a summing module generator is presented, in accordance with one aspect of the present invention.

Figure 2:
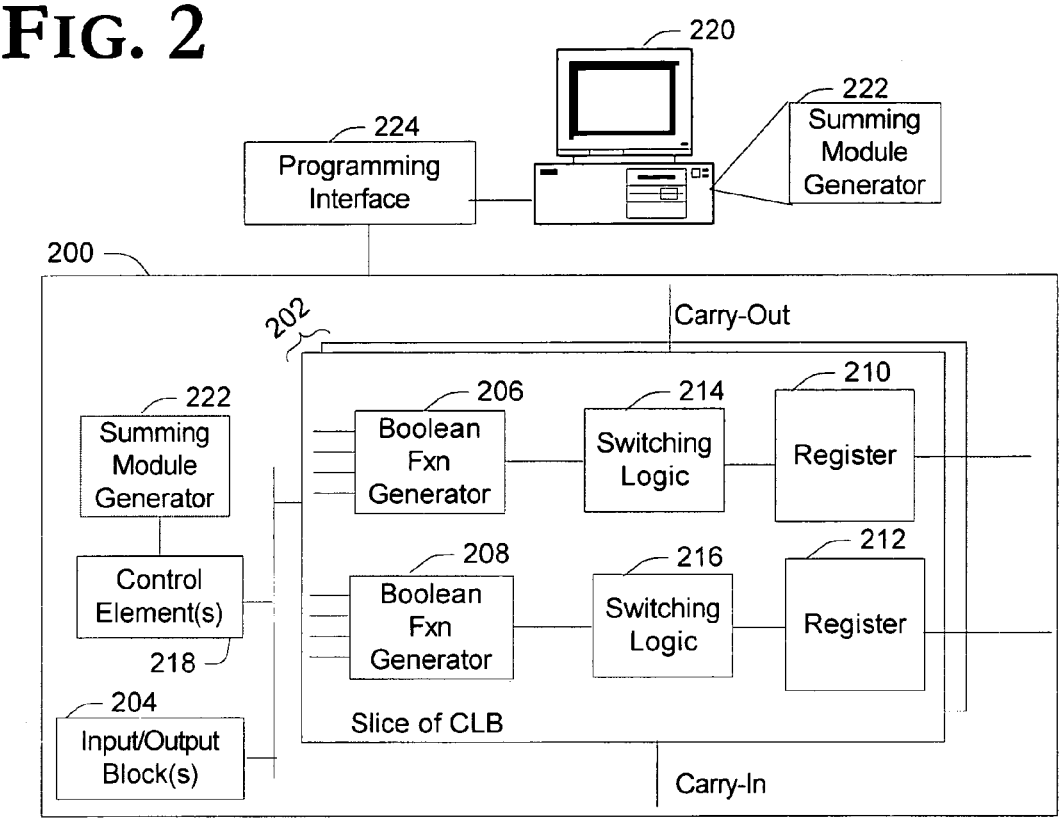
FIG. 2 is a block diagram of an example development environment for a dedicated logic device, in accordance with the teachings of the present invention.

FIG. 2 provides a block diagram of an example programming environment for a dedicated logic device. In accordance with the illustrated example embodiment, the environment is presented comprising an FPGA 200 including one or more configurable logic blocks (CLB) 202, input/output (I/O) blocks 204 and, optionally, one or more control elements 218. Each CLB 202 is depicted comprising Boolean function generator(s) 206, 208 and associated register(s) 210, 212 coupled to the Boolean function generators through switching logic 214, 216. The Boolean function generator is often implemented as a four-input look-up table (LUT), which is programmed to implement certain Boolean logic functions. Each of the CLB elements 206-216 represent the atomic level structural elements of the FPGA. But for their interaction with summing module generator 222 to implement the hyperpipelined hybrid summing module architecture, each of the elements 202-220 and 224 are intended to represent such elements as they are known in the art.

To program the FPGA, a general purpose computer 220 communicates control and set-up instructions to the FPGA 200 through a programming interface. Typically, the computing device 220 will implement a programming application which provides the user with an graphical user interface (GUI) editing environment within design the functionality that will be programmed into the FPGA 200. In accordance with one aspect of the present invention, to be developed more fully below with reference to FIG. 6, general purpose computer 220 includes an innovative application which, when executed, dynamically designs the hyperpipelined architecture for an instance of the hybrid summing module based, at least in part, on a bit-wise analysis of the inputs to the summing module. More particularly, the summing module generator 222 develops a hyperpipelined architecture for an instance of the hybrid summing module at the atomic level of the dedicated logic device.

In alternate implementations, the dedicated logic device may include control elements 218 capable of implementing application(s) such as, for example, summing module generator 222. Thus, in an alternate implementation of the present invention (denoted by ghost blocks in FIG. 2), the dedicated logic device 200 is depicted comprising the summing module generator 222 communicatively coupled to control elements 218. Such an implementation enables the control elements to selectively invoke and instance of the summing module generator 222 to dynamically reallocate CLB atomic resources to generate and implement the hyperpipelined hybrid summing module architecture during execution of the logic device 200.

Example Summing Module Architecture

Figure 3:
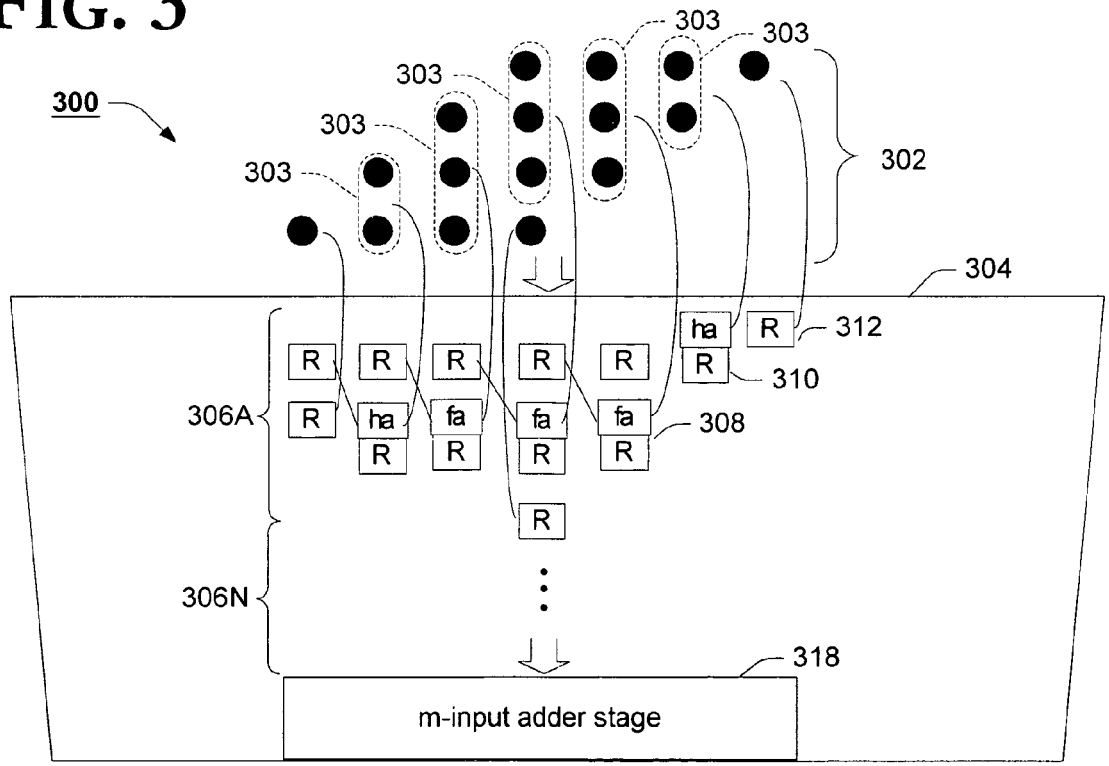
FIG. 3 provides a graphical illustration of an example hyperpipelined hybrid summing module architecture, in accordance with one aspect of the present invention.

FIG. 3 illustrates a block diagram of an example extensible, hyperpipelined summing module architecture 304, in accordance with one example embodiment of the present invention. As introduced above, the innovative architecture of summing module 304 is dynamically implemented within one or more CLB (202) blocks of an FPGA by an instance of summing module generator 222. In accordance with the illustrated example implementation of FIG. 3, summing module 304 is depicted comprising a dynamically generated, pipelined hybrid Wallace adder tree 306 of one or more stages (extensible to a hyperpipelined Wallace tree, i.e., 306A-N) which feeds a final, in-input adder stage 318. For example, the final in-input adder stage 318 may be a stage of two-input adders adder stage 318. As shown, the hybrid Wallace tree 306A-N is presented comprising a dynamically determined number of full-adders (fa) and associated registers (R) 308, half-adders (ha) and associated registers (R) 310 and registers (R) 312. Those skilled in the art will appreciate that each of the hybrid elements are readily implemented within one or more of a look-up table (LUT) and/or registers of a CLB slice of the FPGA, i.e., utilizing the atomic elements of an FPGA.

As introduced above, a full-adder 308 receives three inputs and generates a sum and a carry term, the carry term being promoted to a register associated with the next significant bit. A half-adder 310 receives two inputs to generate a sum and a carry term, the carry term being promoted to a register associated with the next significant bit. In this regard, each of the full-adders 308, half-adders 310 and registers 312 perform their function as commonly known in the art. Thus, but for their innovative implementation as a hyperpipelined, hybrid Wallace tree adder 306, their individual functions need not be described further.

In accordance with one aspect of the present invention, the functional elements, size and configuration of the hybrid Wallace tree 304 are dynamically determined during execution by summing module generator 222. In accordance with one aspect of the present invention, the elements, size and configuration of the hybrid Wallace tree is based, at least in part, on the number and configuration of input terms 302 to be added. More particularly, control elements 202 implementing summing module generator 222 perform a bit-wise analysis of the input terms to identify a number and allocation of elements 308-312 necessary to perform the summation. According to one implementation, described more fully below, the bit-wise analysis is performed to utilize the minimal number and optimal allocation of elements 308-312 to reduce the waste of atomic elements (e.g., LUT) associated with prior art implementations of the Wallace tree which relied solely on full-adder implementations. For purposes of illustration, and not limitation, this feature is further illustrated with reference to a plurality of example input terms 302 in FIG. 3.

With continued reference to FIG. 3, the input terms 302 in the illustrated example are comprised of four (4), four-element terms. In accordance with the general teachings of the Wallace tree, bits of equal significance (i.e., within a column) are added together to produce an incremental sum for a following stage. Moreover, such summing operations were performed using full-adders, regardless of the number of bits associated with a particular significance. In accordance with one aspect of the invention, summing module generator 222 analyzes the number of bits of equal significance (i.e., the number of bits within a column of 302) to determine whether one or more of a full-adder 308, half-adder 310 or register 312 is required to facilitate the hybrid Wallace tree summing.

According to one implementation, summing module generator performs maximal segmentation (virtual grouping of bits denoted by dashed lines 303) within the column to group bits in groups of 3, 2, or 1 bit(s), respectively. Three-bit groups are passed to a full adder for processing, while two-bit groups are passed to a half-adder for processing. Single bit columns are passed directly to an available register 312 within a CLB. In accordance with one aspect of the invention, summing module generator 222 utilizes standard routing analysis tools to identify the optimal atomic layout of each of the allocated elements 308-312 of the hybrid Wallace tree 306. According to one implementation, summing module generator is designed to minimize waste of atomic resources and allocates elements 308-312 in this regard. According to one implementation, summing module generator 222 prioritizes performance speed over waste and, as a result, seeks to minimize routing among and between atomic elements 206-212 implementing the hybrid summing module 306, even at the expense of some waste of atomic resources. In another implementation, resource conservation and performance are equally weighted, with resources allocated accordingly.

In addition to the hybrid Wallace tree 306, summing module 304 includes an m-input adder stage 318. In accordance with one implementation, the m-input adder stage 318 is a two-bit adder that adds the bits stored in registers as a result of the hybrid Wallace tree processing. In accordance with another implementation, i.e., when summing module is utilized in accordance with a multiply-accumulate operation, summing module generator 222 modifies the standard design rules to add another input and a series of registers within the summing module to accept feedback input of accumulator bits. That is, accumulator bits resulting during the multiplication process are fed back to registers (312) allocated within the (integrated) hybrid summing module. In accordance with this integrated summing module architecture, the hybrid Wallace tree resultant bits are added to the accumulator bits in m-input adder stage 318.

Those skilled in the art will appreciate that, although an innovative hyperpipelined hybrid summing module 304 has been introduced with reference to FIG. 3, the summing module may well be leveraged in support of additional arithmetic functions. More particularly, as introduced above, hybrid summing module 304 may well be used as the summing stage of a multiplication process. An example of alternate implementations of the hybrid summing module is presented below with reference to FIGS. 4 and 5.

FIG. 4 illustrates a block diagram of an example complex multiply-accumulate device implementing the teachings of the present invention. In accordance with the illustrated example implementation of FIG. 4, multiplication of complex numbers results in a real component product and an imaginary component product, generated through independent multiplication processing branches. In this regard, CMAC 400 is illustrated comprising a number of input terms 102 to a combinatorial module 104, which generate a number of partial product terms. In accordance with the teachings of the present invention, these partial products provide the input to the innovative hyperpipelined, hybrid summing module 304. In accordance with the teachings of the present invention, introduced above, the summing module generator 222 implements hybrid summing module 304 utilizing one or more of full-adders 308, half-adders 310 and associated registers 312 at the atomic level of, for example, an FPGA to implement a hybrid Wallace tree 306.

As introduced above, certain of the terms in processing the real component are subtracted from one another. Rather than consuming a large segment of FPGA resources by implementing a subtraction module, such terms are merely inverted 402, and the negative of such terms are passed to the hybrid summing module 304.

In accordance with the illustrated example embodiment, hybrid summing module 304 generates an interim partial product in each of the real and imaginary branches, which, in accordance with this example implementation, is passed to an accumulator 112. The accumulator 112 adds the accumulator bits to the incremental products in each of the real and imaginary branches to produce the final product in each of the real and imaginary branches.

FIG. 5 illustrates a block diagram of an example CMAC architecture in accordance with another aspect of the present invention. More specifically, the illustrated example implementation eliminates the accumulators 112 by utilizing an integrated hybrid summing module 502, introduced above. That is, recognizing that the accumulator 112 registers and two-input adders, summing module generator 222 identifies applications wherein an accumulator is required, and selectively adds another input to the summing module 502 to receive feedback of accumulator bits generated during the multiplication process. As introduced above, the accumulator bits are received into registers (312) and are added to the result of the hybrid Wallace tree 306 processing using the m-input adder 318.

Example Operation and Implementation

Having introduced the functional and architectural elements of an example hybrid summing module 304, an example operation and implementation will be further developed with reference to FIGS. 6 through 8. More particularly, FIG. 6 is directed to an example method of designing and constructing a hyperpipelined, hybrid summing module in a dedicated logic device, in accordance with one aspect of the present invention. FIG. 7 provides an example method of identifying the number, type and location of atomic level resources in designing the hyperpipelined hybrid summing module. FIG. 8 provides an example implementation wherein the hyperpipelined hybrid summing module is utilized in a complex multiply-accumulator (CMAC) within a complex logic device. For ease of illustration, the operational and implementation details of FIGS. 6-8 will be developed with continued reference to FIGS. 1-5.

With reference to FIG. 6, a flow chart of an example method for designing and implementing a hyperpipelined hybrid summing module is presented, in accordance with one aspect of the present invention. As introduced above, in accordance with one example implementation, the method of FIG. 6 is implemented by invocation of summing module generator 222.

In accordance with the illustrated example implementation of FIG. 6, the method begins with block 602, wherein summing module generator 222 identifies the number of inputs to be summed. More particularly, summing module generated identifies the number and size of terms to be processed through the hybrid summing module.

In block 604, summing module generator 222 performs a bit-wise analysis of the input terms on a per-bit-significance basis. An example method for performing this bit-wise analysis is presented with reference to FIG. 7, as well as FIG. 3.

Turning briefly to FIG. 7 a flow chart of an example method of selecting the resources required to generate a hybrid Wallace tree is presented, in accordance with one aspect of the present invention. As shown, the method of block 604 begins with block 702 wherein summing module generator 222 analyzes the number of bits associated with each level of bit-significance of the input terms. In block 704, summing module generator maximally segments 303 each of the bits within a particular level of bit-significance in groups of one-, two- or three-bit(s). In block 706, summing module generator 222 associates three-bit segments with a full-adder 308, two-bit segments with a half-adder 310, and one-bit segments with a register 312, which are implemented in a hyperpipelined fashion at the atomic level of an FPGA.

Returning to block 606 of FIG. 6, summing module generator 222 dynamically designs and generates a hybrid Wallace tree architecture of full-adders, half-adders and associated registers based, at least in part, on the bit-wise analysis of the input terms. In accordance with one implementation, as described above, summing module generator 222 dynamically designs a hyperpipelined series of full-adders, half-adders and associated registers utilizing the atomic elements (e.g., look-up table (LUT) and registers) of the logic cells of the dedicated logic device to implement the hybrid Wallace tree.

In block 608, summing module generator 222 identifies the application(s) in which the hybrid summing module 304 is to be used to determine whether any additional features can be integrated within the design. In accordance with one example implementation, introduced above, summing generator module 222 determines whether the summing module 304 is to be implemented in a multiply-accumulate function.

If, in block 608, summing module generator 222 determines that the hybrid summing module does not require additional integrated features, the process continues with block 610 wherein summing module generator adds a final adder stage to the summing module. More particularly, summing module generator 222 logically couples the output of the hybrid Wallace tree through an m-input adder to generate the final sum.

In block 612, once the design of the summing module 304 is completed, summing module generator 222, perhaps in association with other FPGA design tools (not shown) available on computing system 220, performs a routing and placement at the atomic level of the FPGA 200.

If, in block 608, summing module generator 222 identifies that the summing module 304 will be implemented in a multiply-accumulator (or, similarly, a CMAC), summing module generator 222 allocates additional registers and input to receive accumulator bits via a feedback path, block 614. In this regard, summing module generator 222 designs an integrated hybrid summing module 502 incorporating additional resources to perform the accumulate function within the integrated hybrid summing module. As before, the process continues with block 610 wherein summing module generator 222 logically couples the output of the hybrid Wallace tree as well as any additional processing registers (e.g., associated with the accumulator bits) through an m-input adder to generate a final sum.

FIG. 8 illustrates a flow chart of an example implementation of the innovative hybrid summing module, in accordance with one embodiment of the present invention. More particularly, FIG. 8 illustrates an example method of performing a complex multiply-accumulate in one branch of CMAC 500 utilizing the innovative integrated hybrid summing module 502, introduced above.

In accordance with the illustrated example implementation of FIG. 8, the method begins with block 802, wherein a combinatorial stage 104 of a CMAC 500 generates a plurality of partial product terms from inputs 102. As introduced above, certain ones of the partial products in a real component branch of CMAC 500 are inverted 402 before being passed to the integrated summing module 502.

In block 804, the partial product terms are passed to the integrated hybrid summing module 502 wherein the partial products are summed using a hyperpipelined hybrid Wallace tree 306 of full-adders, half-adders, and associated registers.

In block 806, the integrated hybrid summing module 502 receives accumulator bits via a feedback path.

In block 808, a final addition of the result of the hybrid Wallace tree and any accumulator bits is performed to generate a final product term in each of the real and imaginary components of the CMAC 500.

Recall the following matrices from the Background section, above:

$$(a1 + b1j, a2 + b2j)\begin{pmatrix} c1 + d1j \\ c2 + d2j \end{pmatrix}$$

More specifically, recall that it required eight (8) discrete processing steps to generate the real and imaginary product terms using a standard CMAC procedure in a DSP. Utilizing the CMAC 500 introduced above, the products are generated in two steps, i.e., (1) $I_1 = (a_1 * c_1) - (b_1 * d_1)$ which is performed simultaneously with $Q_1 = (a_1 * d_1) + (b_1 * c_1)$; and (2) $I_2 = (a_2 * c_2) - (b_2 * d_2)$ and added to $I_1$; performed simultaneously with $Q_2 = (a_2 * d_2) + (b_2 * c_2)$ and added to $Q_1$.

Those skilled in the art will appreciate that the hyperpipelined architecture and improved data flow at the atomic level the logic blocks facilitate a significant performance improvement in CMAC processing.

Alternate Embodiments

FIG. 9 is a block diagram of a storage medium having stored thereon a plurality of instructions including instructions to implement the summing module generator 222, the hybrid summing module architecture 304 and/or the integrated summing module architecture 502, according to yet another embodiment of the present invention. In general, FIG. 9 illustrates a storage medium/device 900 having stored thereon a plurality of machine-executable instructions including at least a subset of which that, when executed, implement one or more aspects of the present invention.

As used herein, storage medium 900 is intended to represent any of a number of storage devices and/or storage media known to those skilled in the art such as, for example, volatile memory devices, non-volatile memory devices, magnetic storage media, optical storage media, and the like. Similarly, the executable instructions are intended to reflect any of a number of software languages known in the art such as, for example, C++, Visual Basic, Very High Speed Integrated Circuit (VHSIC) Development Language (VHDL), Hyper-text Markup Language (HTML), Java, eXtensible Markup Language (XML), and the like. Moreover, it is to be appreciated that the storage medium/device 900 need not be co-located with any host system. That is, storage medium/device 900 may well reside within a remote server communicatively coupled to and accessible by an executing system. Accordingly, the software implementation of FIG. 9 is to be regarded as illustrative, as alternate storage media and software embodiments are anticipated within the spirit and scope of the present invention.

Although the invention has been described in the detailed description as well as in the Abstract in language specific to structural features and/or methodological steps, it is to be understood that the invention defined in the appended claims is not necessarily limited to the specific features or steps described. Rather, the specific features and steps are merely disclosed as exemplary forms of implementing the claimed invention. It will, however, be evident that various modifications and changes may be made thereto without departing from the broader spirit and scope of the present invention. The present specification and figures are accordingly to be regarded as illustrative rather than restrictive. The description and abstract are not intended to be exhaustive or to limit the present invention to the precise forms disclosed.

The terms used in the following claims should not be construed to limit the invention to the specific embodiments disclosed in the specification. Rather, the scope of the invention is to be determined entirely by the following claims, which are to be construed in accordance with the established doctrines of claim interpretation.

I claim:

1. A method comprising:

analyzing input terms on a bit-wise basis to segment each level of bit significance of input terms into one or more groups of three bits, and/or one or more groups of two bits and/or one or more groups of one bit;

designing a hyperpipelined series of Boolean function generators, based at least in part on the analyzing, to implement a Wallace-architecture of full-adders to receive at least a portion of the one or more groups of three bits, half-adders to receive at least a portion of the one or more of the groups of two bits, associated registers to receive at least a portion of the one or more the groups of one bit in the selected resources, and a multi-input adder to combine the input terms to produce intermediate summation results;

selecting atomic elements of a dedicated logic device in which to implement the Wallace-architecture of full-adders, half-adders, and associated registers;

selecting atomic elements to implement control logic, the control logic configured to dynamically reallocate the atomic elements implementing the Wallace-architecture of full-adders, half-adders, and associated registers in response to a subsequent analysis of the input terms on a bit-wise basis;

selecting atomic elements to implement a first combinatorial module, the first combinatorial module to generate partial products of real components of a plurality of complex numbers; and selecting atomic elements to implement a second combinatorial module, the second combinatorial module to generate partial products of imaginary components of the complex numbers;

wherein the partial products of the combinatorial modules form the input terms.

2. The method of claim 1 wherein selecting atomic elements of the dedicated logic device in which to implement the Wallace-architecture comprises selecting atomic elements of a field programmable gate array (FPGA) in which to implement the Wallace-architecture of full-adders, half-adders, and associated registers.

3. The method of claim 1, further comprising:
determining a minimal number of full-adders, half-adders, and associated registers with which the Wallace-architecture could be implemented; and
selecting atomic elements of the dedicated logic device to reduce a number of atomic elements left unused in the design, to implement the Wallace architecture with a number of full-adders, half-adders, and associated registers that approaches the minimum number.

4. The method of claim 1 further comprising:
selecting atomic elements of the dedicated logic device to implement the Wallace-architecture of full-adders, half-adders, and associated registers; and
wherein designing the hyperpipelined series of Boolean function generators comprises assigning proximate atomic elements functions to reduce routing distances between stages of the Wallace-architecture.

5. The method of claim 1 further comprising:
determining a minimal number of full-adders, half-adders, and associated registers with which the Wallace-architecture could be implemented; and
wherein designing the hyperpipelined series of Boolean function generators comprises selecting atomic elements of the dedicated logic device to implement the Wallace-architecture with the minimal number of full-adders, half-adders, and associated registers while concurrently assigning proximate atomic elements to functions that result in reducing routing distances between stages of the Wallace-architecture.

6. The method of claim 1 further comprising:
selecting one or more field programmable gate arrays (FPGAs) in the system in which to implement the Wallace-architecture of full-adders, half-adders, and associated registers;
wherein designing the hyperpipelined series of Boolean function generators to implement the Wallace-architecture of full-adders, half-adders, and associated registers in the selected resources comprises designing the hyperpipelined series of Boolean function generators to be implemented with the atomic elements of the selected FPGA(s).

7. The method of claim 1 wherein designing the hyperpipelined series of Boolean function generators to implement the Wallace-architecture comprises designing the hyperpipelined series of Boolean function generators to increase grouping of bits of a same level of bit-significance of the input terms.

8. The method of claim 1 wherein designing the hyperpipelined series of Boolean function generators comprises dynamically designing the hyperpipelined series of Boolean function generators to implement desired instances of the Wallace-architecture in response to the control logic.

9. The method of claim 1 further comprising:
implementing the design in the dedicated logic device by assigning the atomic elements of the dedicated logic device according to the design.

10. The method of claim 1 further comprising:
identifying features of other components that can be integrated into the design of the Wallace-architecture; and
wherein designing the hyperpipelined series of Boolean function generators includes integrating the identified features into the Wallace-architecture.

11. The method of claim 10 wherein designing the hyperpipelined series of Boolean function generators includes adding accumulator bits from the other components to a summation result achieved by the Wallace-architecture.

12. The method of claim 10 wherein designing the hyperpipelined series of Boolean function generators includes coupling the Wallace-architecture to output a summation result to at least one of the other components.

13. The method of claim 1, wherein designing the hyperpipelined series of Boolean function generators further comprises:
designing the hyperpipelined series of Boolean function generators to implement the multi-input adder in a pipeline stage of the hyperpipelined series of Boolean function generators immediately after a final pipeline stage of full-adders, half-adders, and/or registers.

14. The method of claim 1, further comprising:
selecting atomic elements to implement a third combinatorial module, the third combinatorial module to generate partial products of a real component of a first complex number of complex numbers and an imaginary component of a second complex number of the complex numbers; and
selecting atomic elements to implement a fourth combinatorial module, the fourth combinatorial module to generate partial products of an imaginary component of the first complex number of complex numbers and a real component of the second complex number of the complex numbers.

15. An article of manufacture comprising a machine-accessible medium having content to provide instructions for generating a complex arithmetic summing module, the content to provide the instructions to cause an electronic system to:
analyze input terms on a bit-wise basis to segment each level of bit significance of input terms into one or more groups of three bits, and/or one or more groups two bits and/or one or more groups of one bit;
design a hyperpipelined series of Boolean function generators to implement a Wallace-architecture of full-adders, based at least in part on the analyzed input terms, to receive at least a portion of the one or more groups of three bits, half-adders to receive at least a portion of the one or more the groups of two bits, associated registers to receive at least a portion of the one or more the groups of one bit in the selected resources, and a multi-input adder to combine the input terms to produce intermediate summation results;

select atomic elements of a dedicated logic device in which to implement the Wallace-architecture of full-adders, half-adders, and associated registers;

select atomic elements to implement control logic, the control logic configured to dynamically reallocate the atomic elements implementing the Wallace-architecture of full-adders, half-adders, and associated registers in response to subsequent analysis of the input terms on a bit-wise basis;

select atomic elements to implement a first combinatorial module, the first combinatorial module to generate partial products of real components of a plurality of complex numbers; and select atomic elements to implement a second combinatorial module, the second combinatorial module to generate partial products of imaginary components of the complex numbers;

wherein the partial products of the combinatorial modules form the input terms.

16. The article of manufacture of claim 15 further comprising content to provide instructions to cause the electronic system to select atomic elements of a field programmable gate array (FPGA) in which to implement the Wallace-architecture of full-adders, half-adders, and associated registers.

17. The article of manufacture of claim 15 further comprising content to provide instructions to cause the electronic system to:
determine a minimal number of full-adders, half-adders, and associated registers with which the Wallace-architecture could be implemented; and
select atomic elements of the dedicated logic device to reduce a number of atomic elements left unused in the design, to implement the Wallace architecture with a number of full-adders, half-adders, and associated registers that approaches the minimum number.

18. The article of manufacture of claim 15 further comprising content to provide instructions to cause the electronic system to:
provide instructions to cause the electronic system to assign proximate atomic elements functions to reduce routing distances between stages of the Wallace-architecture.

19. The article of manufacture of claim 15 further comprising content to provide instructions to cause the electronic system to:
determine a minimal number of full-adders, half-adders, and associated registers with which the Wallace-architecture could be implemented; and
select atomic elements of the dedicated logic device to implement the Wallace-architecture with the minimal number of full-adders, half-adders, and associated registers and concurrently to assign proximate atomic elements to functions to result in reducing routing distances between stages of the Wallace-architecture.

20. The article of manufacture of claim 15 further comprising content to provide instructions to cause the electronic system to:
select one or more field programmable gate arrays (FPGAs) coupled with the controller in which to implement the Wallace-architecture of full-adders, half-adders, and associated registers; and
design the hyperpipelined series of Boolean function generators to be implemented with the atomic elements of the selected FPGA(s).

21. The article of manufacture of claim 15 further comprising content to provide instructions to cause the electronic system to design the hyperpipelined series of bits of a same level of bit-significance of the input terms.

22. The article of manufacture of claim 15 further comprising content to provide instructions to cause the electronic system to dynamically design the hyperpipelined series of Boolean function generators to implement desired instances of the Wallace-architecture.

23. The article of manufacture of claim 15 further comprising content to provide instructions to cause the electronic system to:
implement the design in the dedicated logic device by assigning the atomic elements of the dedicated logic device according to the design.

24. The article of manufacture of claim 15 further comprising content to provide instructions to cause the electronic system to:
identify features of the other components that can be integrated into the design of the Wallace-architecture; and
wherein the content to provide instructions to cause the electronic system to design the hyperpipelined series of Boolean function generators includes the content to provide instructions to cause the electronic system to integrate the identified features into the Wallace-architecture.

25. The article of manufacture of claim 24 further comprising content to provide instructions to cause the electronic system to add accumulator bits from the other components to a summation result achieved by the Wallace-architecture.

26. The article of manufacture of claim 24 further comprising content to provide instructions to cause the electronic system to couple the Wallace-architecture to output a summation result to at least one of the other components.

27. A logic device, comprising:
a plurality of hybrid summing modules to combine a plurality of partial products into a plurality of intermediate summation results;
plurality of adders to add corresponding ones of the plurality of intermediate summation results;
control elements to dynamically reallocate a plurality of atomic elements forming at least one of the hybrid summing modules and the adder in response to an analysis of the partial products;
a first combinatorial module to generate a first portion of the partial products in response to a first input and a second input; and
a second combinatorial module to generate a second portion of the partial products in response to a third input and a fourth input.

28. The logic device of claim 27, the hybrid summing module being a first hybrid summing module and the adder being a first adder, the logic device further comprising:
a third combinatorial module to generate a first portion of a second plurality of partial products in response to the first input and the fourth input;
a fourth combinatorial module to generate a second portion of the second plurality of partial products in response to the second input and the third input;
a second hybrid summing module to combine a plurality of partial products into a plurality of intermediate summation results; and
a second adder to add the intermediate summation results.

* * * * *

UNITED STATES PATENT AND TRADEMARK OFFICE
CERTIFICATE OF CORRECTION

PATENT NO. : 7,424,506 B2  Page 1 of 1
APPLICATION NO. : 09/823928
DATED : September 9, 2008
INVENTOR(S) : John T. Orchard It is certified that error appears in the above-identified patent and that said Letters Patent is hereby corrected as shown below:

At column 14, line 3, after "series of" insert -- Bollean function generators to increase grouping of --.

Signed and Sealed this

Second Day of November, 2010

David J. Kappos
*Director of the United States Patent and Trademark Office*